US008285928B2

(12) United States Patent
Matsui et al.

(10) Patent No.: US 8,285,928 B2

(45) Date of Patent: Oct. 9, 2012

(54) STORAGE CONTROL APPARATUS AND STORAGE CONTROL METHOD FOR RECOVERING DATA IN A FAILED STORAGE DEVICE OF A RAID SYSYTEM

(75) Inventors: Akira Matsui, Fujisawa (JP); Kenichi Nishikawa, Odawara (JP); Yoshifumi Zimoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/304,366

(22) PCT Filed: Nov. 17, 2008

(86) PCT No.: PCT/JP2008/003353

§ 371 (c)(1),
(2), (4) Date: Dec. 11, 2008

(87) PCT Pub. No.: WO2010/055549

PCT Pub. Date: May 20, 2010

(65) Prior Publication Data

US 2011/0252194 A1 Oct. 13, 2011

(51) Int. Cl.
*G06F 12/12* (2006.01)

(52) U.S. Cl. ................ 711/114; 711/166; 711/E12.069; 711/E12.103

(58) Field of Classification Search ........................ None
See application file for complete search history.

(56) References Cited

U.S. PATENT DOCUMENTS

| | | | | |
|---|---|---|---|---|
| 6,583,947 | B1 * | 6/2003 | Hakamata et al. | 360/69 |
| 7,035,972 | B2 * | 4/2006 | Guha et al. | 711/114 |
| 7,380,088 | B2 * | 5/2008 | Wang et al. | 711/170 |
| 7,516,348 | B1 * | 4/2009 | Ofer | 713/324 |
| 7,904,651 | B2 * | 3/2011 | Muramatsu et al. | 711/114 |
| 7,996,612 | B2 * | 8/2011 | Ukai et al. | 711/114 |
| 2006/0077724 | A1 * | 4/2006 | Chikusa et al. | 365/189.05 |
| 2006/0193073 | A1 * | 8/2006 | Hakamata et al. | 360/69 |
| 2007/0143542 | A1 * | 6/2007 | Watanabe et al. | 711/114 |
| 2008/0080131 | A1 * | 4/2008 | Hori et al. | 361/685 |

FOREIGN PATENT DOCUMENTS

| | | | |
|---|---|---|---|
| EP | 1936486 | A2 | 6/2008 |
| EP | 1965298 | A2 | 9/2008 |
| JP | 2001-339853 | | 12/2001 |
| JP | 2008-090352 | | 4/2008 |

* cited by examiner

*Primary Examiner* — Kevin Ellis
*Assistant Examiner* — Eric Loonan
(74) *Attorney, Agent, or Firm* — Brundidge & Stanger, P.C.

(57) ABSTRACT

This storage control apparatus 100 is able sufficiently to manifest the merits of economization of electrical power. The storage control apparatus 100 includes one or more additional storage units 150 which are adapted for the supply of power to them to be turned ON and OFF individually. Each of these additional storage units 150 includes a plurality of storage devices 154 (for example, a plurality of HDDs). When a user actuates a management device 106, and causes one or more RAID groups and a spare HDD for each of these RAID groups to be set within the storage control apparatus 100, an MPU 140 of the storage control apparatus 100 controls the management device 106 to make the user set each RAID group and the spare HDD for it within the same additional storage unit 150.

11 Claims, 13 Drawing Sheets

FUNCTION MANAGEMENT TABLE

| POWER ECONOMIZATION FUNCTION | FLAG |
|---|---|
| DRIVE SPIN CONTROL | VALID |
| ADDITIONAL UNIT POWER SUPPLY CONTROL | VALID |

SPARE MANAGEMENT TABLE

| RECOVERY PROCESSING | FLAG |
|---|---|
| COPY-BACKLESS | VALID |
| COPY-BACK | INVALID |

DISK MANAGEMENT TABLE

| CHASSIS ID | HDD ID | CAPACITY | RG ID | SPARE |
|---|---|---|---|---|
| 1 | 1-1 | 72GB | | |
| | 1-2 | 72GB | | |
| | 1-3 | 72GB | | |
| | 1-4 | 72GB | | |
| | 1-5 | 72GB | | |
| | 1-6 | 72GB | | |
| 2 | 2-1 | 146GB | | |
| | 2-2 | 146GB | | |
| | 2-3 | 146GB | | |
| | 2-4 | 146GB | | |
| | 2-5 | — | | |
| | 2-6 | 146GB | | |
| ... | ... | ... | | |

DISK MANAGEMENT TABLE

| CHASSIS ID | HDD ID | CAPACITY | RG ID | SPARE |
|---|---|---|---|---|
| 1 | 1-1 | 72GB | 1 | — |
| | 1-2 | 72GB | 1 | — |
| | 1-3 | 72GB | 1 | — |
| | 1-4 | 72GB | 1 | — |
| | 1-5 | 72GB | 1 | — |
| | 1-6 | 72GB | — | 1 |
| 2 | 2-1 | 146GB | 2 | — |
| | 2-2 | 146GB | 2 | — |
| | 2-3 | 146GB | 2 | — |
| | 2-4 | 146GB | 2 | — |
| | 2-5 | — | — | — |
| | 2-6 | 146GB | | 2 |
| ... | ... | ... | ... | ... |

| RAID GROUP | 00 |
|---|---|
| RAID LEVEL | 5 |
| DRIVE STRUCTURE | 4D+1P |

| DRIVE SELECTION | CHASSIS | SLOT | TYPE | CAPACITY |
|---|---|---|---|---|
| | 00 | 00 | F | 146GB |
| | | 01 | F | 146GB |
| | | 02 | F | 146GB |
| | | 03 | F | 146GB |
| | | 04 | F | 146GB |
| | 01 | 00 | F | 146GB |
| | | 01 | F | 146GB |
| | | | | |

STORAGE CONTROL APPARATUS AND STORAGE CONTROL METHOD FOR RECOVERING DATA IN A FAILED STORAGE DEVICE OF A RAID SYSYTEM

TECHNICAL FIELD

The present invention relates to a storage control apparatus and a storage control method.

BACKGROUND ART

In a storage control apparatus, a storage unit is provided in which a large number of hard disk drives are connected in the form of an array, and such a device supplies a logical storage region (a logical volume) to a host computer such as a server or the like (hereinafter termed a "host"). In order to enhance the reliability and so on, the storage region supplied to the host by the storage control apparatus is made redundant on the basis of RAID (Redundant Array of Independent Disks).

The amount of data which must be managed by a business or the like increases day by day. Accordingly it is desirable for a storage control apparatus to be able to increase its storage capacity in correspondence to this increase of the amount of data. Thus, a storage control apparatus is per se known (for example, refer to Patent Citation 1) which can supply a storage region expanded according to the wish of the user, by a desired number of additional chassis containing additional storage units being added on to the basic chassis containing the basic storage units.

With this type of storage control apparatus, in order to economize upon electrical power, it is per se known to performing turning ON and OFF of the power supply to each of the additional chassis (for example, refer to Patent Citation 2).

Now, with a storage control apparatus to which a plurality of storage devices (for example a plurality of hard disk drives) are mounted and to which the RAID technique is applied, if a failure should take place with any one of the plurality of data storage devices which makes up some RAID group, then, as a method of procedure for recovering from this breakdown using a spare storage device, in the prior art, either of the methods (1) and (2) described below has been used.

(1) Copy-Back

Data which is the same as the data stored on the faulty storage device is recovered upon the spare storage device. After the faulty storage device has been exchanged for a new storage device, the recovered data upon the spare storage device is copied back to the new storage device. And the new storage device is installed to the RAID group in question as a new data storage device. In this specification, this method of procedure will be termed "copy-back".

(2) Copy-Backless

Data which is the same as the data stored on the faulty storage device is recovered upon the spare storage device. And this spare storage device is installed to the RAID group in question as a new storage device. A new storage device, which has been exchanged for the faulty storage device, is now used as a new spare storage device for this RAID group. In this specification, this method of procedure will be termed "copy-backless".

The merit of the copy-backless procedure, as compared with the copy-back procedure, is that the time period required to recover from a fault is shortened. In the prior art, the user has been able to determine at will at which positions the plurality of storage devices and spare storage devices which make up each RAID group are fitted in the plurality of additional chassis, and which of copy-back or copy-backless operation is selected.

[Patent Citation 1]

Japanese Laid-Open Patent Publication 2001-339853;

[Patent Citation 2]

Japanese Laid-Open Patent Publication 2008-090352.

DISCLOSURE OF INVENTION

According to the prior art technique, it has been possible for the user to determine at will at which positions in the plurality of additional chassis the plurality of storage devices and spare storage devices which make up each RAID group are fitted. However, with a storage control apparatus which is endowed with the MAID function in which turning ON and OFF of the power supply is performed for each additional chassis, there is the problem that the merit of power saving is not sufficiently obtained. This problem is particularly prominent if copy-backless operation has been selected.

In other words, if some RAID group and a spare device for that RAID group are mounted to different additional chassis, then the conditions for permitting the turning OFF of the power supply to the additional chassis to which that spare device is mounted come to depend upon the operational state of that RAID group which is mounted to the other additional chassis. In particular, in the case of copy-backless operation, this degree of dependence is stronger than in the case of copy-back operation. Accordingly, the frequency at which the opportunity arises to be able to turn OFF the power supply to each additional chassis is reduced, so that the merit of economizing electrical power is not sufficiently exhibited.

Accordingly, the object of the present invention is to provide a storage control apparatus which, with the RAID technique, can sufficiently exhibit the merit of economizing electrical power.

According to the present invention, a storage control apparatus includes one or more storage units which are adapted for their power supplies to be turned ON and OFF individually, according to the MAID technique. Each of these storage units includes a plurality of storage devices. When the user actuates the management device and performs setting of one or more RAID groups within the storage control apparatus and of a spare HDD for each of these RAID groups, the storage control apparatus controls the management device, and invites the user to set the spare HDD of each of the RAID groups within the same additional storage unit as that RAID group.

According to one aspect of the present invention, there is provided a storage control apparatus, comprising: a plurality of storage units each comprising a plurality of storage devices; power supply devices which have the function of turning ON and OFF supply of power to each of said plurality of storage units individually; and a control device which can communicate with a management device for inputting commands of various types; wherein said control device: receives a RAID setting command from said management device which designates two or more storage devices within said plurality of storage units, and sets said two or more storage devices which have been designated as a single RAID group;

receives a spare setting command from said management device which designates at least a single storage device within said plurality of storage units, and sets said at least a single storage device which has been designated as a spare device for said single RAID group;

performs unit power supply control by controlling said power supply devices so as to turn the power supply to each of said storage units ON and OFF individually; and controls said management device when said RAID setting command is inputted, so that two or more storage devices which can be designated by said RAID setting command as a single RAID group are limited to being only two or more storage devices which are present in the same storage unit.

The control device may further control said management device when said spare setting command is inputted, so that at least one storage device which can be designated by said spare setting command as said spare device for said single RAID group is limited only to those storage devices which are present within the same storage unit as said single RAID group.

The control device, further, may:

receive from said management device a recovery processing setting command which designates either copy-back or copy-backless as recovery processing from a failure of a RAID group which utilizes a spare device, and set said one recovery processing which has been designated by said recovery processing setting command; and in the case where said copy-back is set for said recovery processing, check whether or not a plurality of storage devices which have different storage capacities are present within said same storage unit, and, if the result of this check is YES, control said spare setting command which is inputted to said management device, so that only at least one said storage device which has the largest storage capacity within said same storage unit can be set as said spare device.

The control device, further, may select one at a time of said plurality of storage units, and may control said management device when said RAID setting command and said spare setting command are both inputted, so that the plurality of storage devices which can be designated by said RAID setting command and said spare setting command as said single RAID group and said spare device for said single RAID group are limited to being only the plurality of storage devices which are present within said single storage unit which has been selected.

The control device, further, may:

receive a function setting command from said management device which designates whether or not said unit power supply control function is to be valid, and set said unit power supply control function to be valid or invalid according thereto; and in the case where said individual turning ON and OFF function is changed over from invalid to valid, check whether or not two or more of the storage devices which are included in some one RAID group are present as dispersed over different storage units, and, if the result of this check is YES, notify said management device of the necessity of re-setting that RAID group.

Further, in the case said individual turning ON and OFF function has been changed over by said function setting means from invalid to valid, the control device may check whether or not said copy-back is set as said recovery processing, and, if the result of this check is YES, may notify said management device of the necessity of changing said setting from copy-back to copy-backless.

Each of said plurality of storage units may be contained within a different chassis.

The control device, further, may receive from said management device a spin down command or a spin up command designating at least a single RAID group, and may control supply of power to at least one storage unit included in said at least a single raid group which has been designated based thereupon.

In response to said spin down command, The control device, further, may check whether or not all of the storage devices within at least one storage unit which is included in said at least a single RAID group which has been designated are in a state in which they can be spun down, and, if the result of this check is YES, may turn OFF the power supply to said at least one storage unit which is included in said at least a single RAID group which has been designated.

Further, in response to said spin up command, The control device may check whether the power supply to at least a single storage unit which is included in said at least a single RAID group which has been designated is OFF or not, and, if the result of this check is YES, may turn ON the power supply to said at least one storage unit which is included in said at least a single RAID group which has been designated, and thereafter may spin up said at least a single RAID group which has been designated.

Said plurality of storage units may include at least a single base storage unit and one or more additional storage units. And said power supply device may comprise a base power supply unit which supplies power to said control device and said base storage unit, and one or more switchable power supply units which supply power individually to each of said one or more additional storage units, and which can be turned power ON and OFF individually. Moreover, there may be further included one or more back end switches which connect each of said one or more additional storage units individually to said control device, and which can be turned ON and OFF individually.

According to another aspect of the present invention, there is provided a method for economizing upon electrical power for a storage control apparatus which comprises a plurality of storage units each comprising a plurality of storage devices, comprising the steps of:

receiving a RAID setting command from said management device which designates two or more storage devices within said plurality of storage units, and setting said two or more storage devices which have been designated as a single RAID group; a step of receiving a spare setting command from said management device which designates at least a single storage device within said plurality of storage units, and setting said at least a single storage device which has been designated as a spare device for said single RAID group; and a step of controlling said power supply devices so as to turn the power supply to each of said storage units ON and OFF individually; and controlling said management device when said RAID setting command is inputted, so that two or more storage devices which can be designated by said RAID setting command as a single RAID group are limited to being only two or more storage devices which are present in the same storage unit.

With this method according to the present invention, there may be further included a step of controlling said management device when said spare setting command is inputted, so that at least one storage device which can be designated by said spare setting command as said spare device for said single RAID group is limited only to those storage devices which are present within the same storage unit as said single RAID group.

BRIEF DESCRIPTION OF DRAWINGS

FIG. 4 is a figure showing an example of the contents of a function management table 202.

FIG. 5 is a figure showing an example of the contents of a spare management table 206.

FIG. 6A is a figure showing an example of the contents of a disk management table 204 in its initial state, when no RAID groups or spare HDDs have yet been set.

FIG. 6B is a figure showing an example of the contents of the disk management table 204, after settings for several RAID groups and their spare HDDs have been made.

EXPLANATION OF REFERENCE

Figure 1:
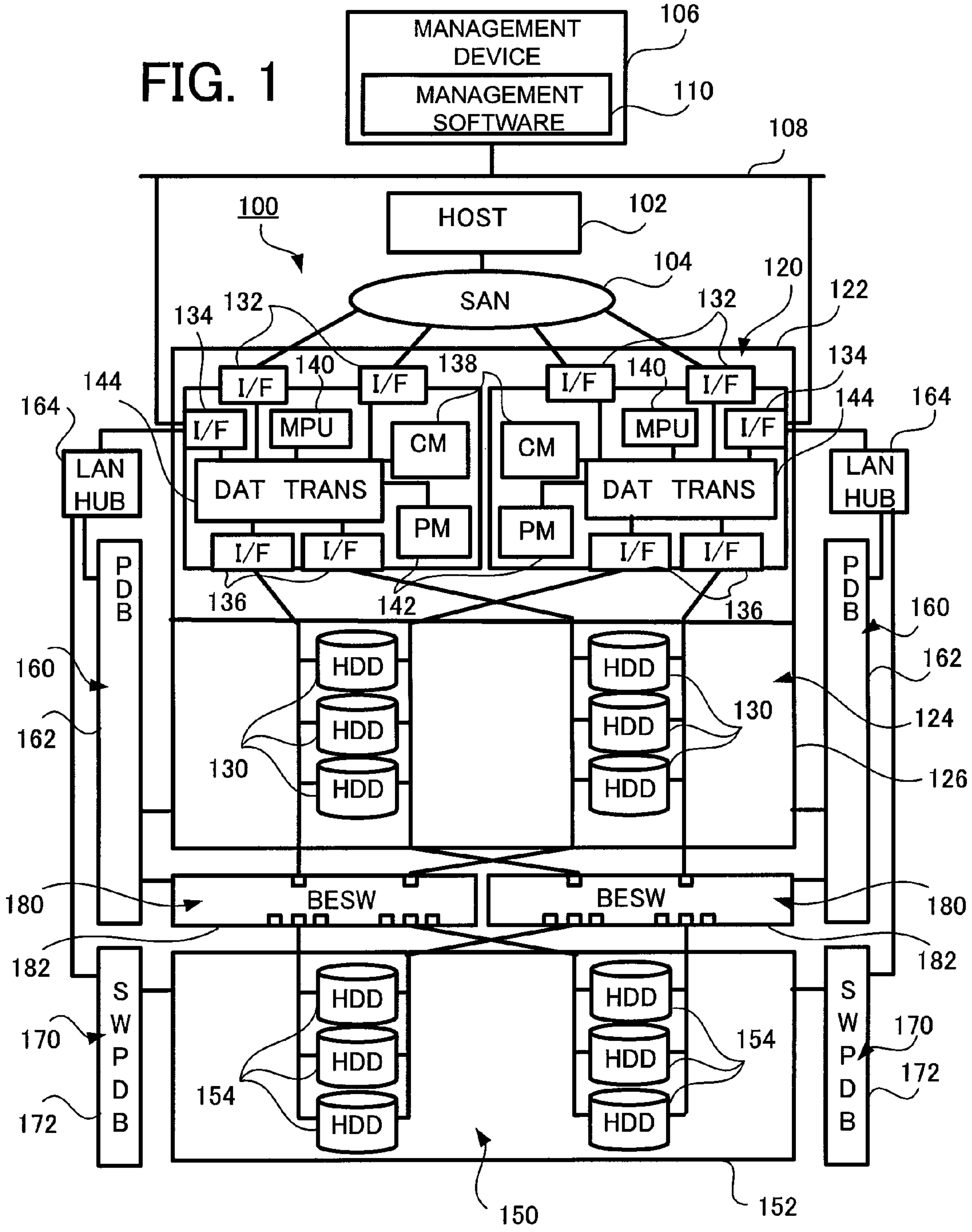
FIG. 1 is a block diagram showing the overall structure of a storage control apparatus 100 according to an embodiment of the present invention.

100: storage control apparatus
106: management device
110: management software
120: control device
140: MPU
130,154: HDD s (storage devices)
124: base storage unit
126: chassis of base storage unit
150: additional storage unit
152: chassis of additional storage unit
160: PDB (power distribution box)
170: switchable PDB (switchable power distribution box)
180: back end switch
200: power supply control program
202: function management table
204: disk management table
206: spare management table
210: recovery processing setting
220: additional unit power supply control setting
230: HDD installation state confirmation
240,290: RAID/spare setting
280: RAID/spare setting screen
310: additional unit power supply control supplementary setting
330: additional unit power supply control

BEST MODE FOR CARRYING OUT THE INVENTION

In the following, an embodiment of the present invention will be explained with reference to the drawings.

Figure 2A:
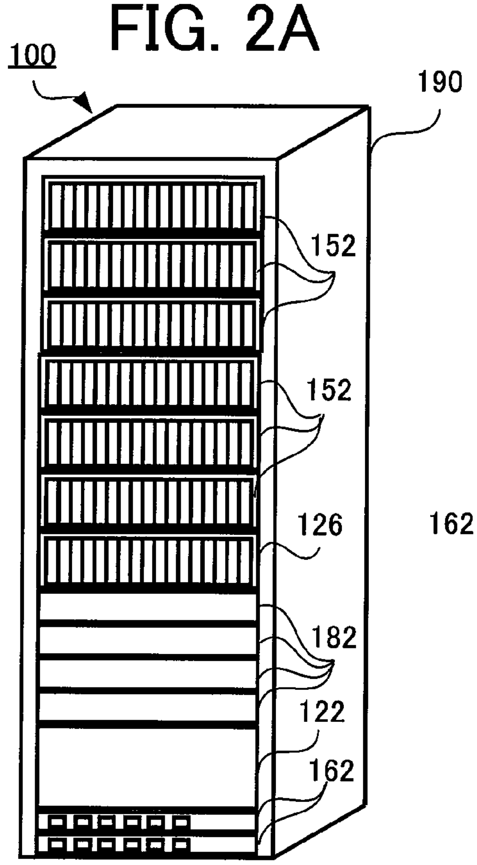
FIG. 2A is a perspective view showing the external appearance of this storage control apparatus 100.
Figure 2B:
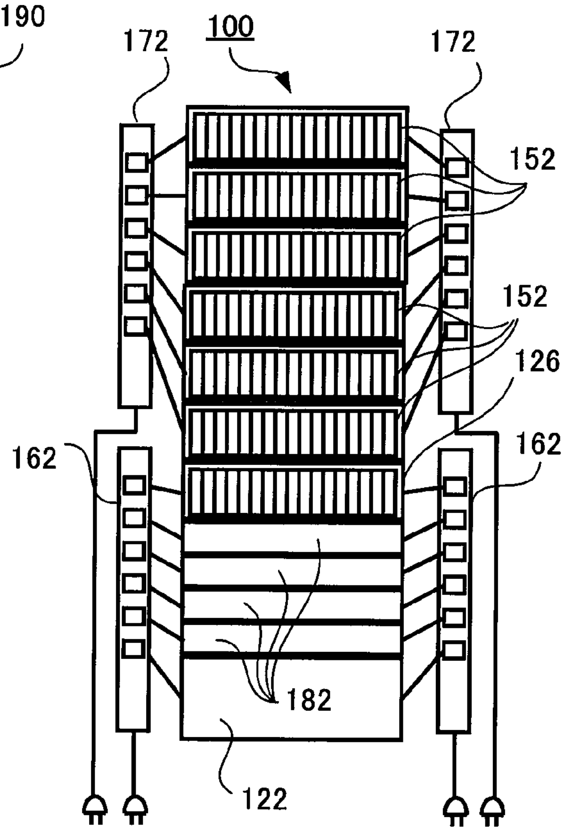
FIG. 2B is a block diagram showing the electrical connection relationship for supply of power between a plurality of chassis which are included in this storage control apparatus 100.

FIG. 1 shows the overall structure of a storage control apparatus 100 according to an embodiment of the present invention. Moreover, FIG. 2A shows the external appearance of this storage control apparatus 100, and FIG. 2B shows the electrical connection relationship for supply of power between a plurality of chassis which are included in this storage control apparatus 100.

A summary of the storage control apparatus 100 shown in FIG. 1 is as follows. This storage control apparatus 100 is made so as to be able sufficiently to manifest the merit of electrical power saving according to the MAID technique. The storage control apparatus 100 comprises a plurality of storage units, each of which is built so that its power supply can be turned ON and OFF individually according to the MAID technique; in other words, it comprises a single base storage unit 124 and one or more additional storage units 150. The base storage unit 124 comprises a plurality of storage devices (for example, a plurality of hard disks, i.e. HDDs) 130, and each of the additional storage units 150 comprises a plurality of storage devices (for example, a plurality of hard disks, i.e. HDDs) 154. By the user actuating a management device 106, it is made possible to set one or more RAID groups within the storage control apparatus 100, and a spare HDD for each RAID group; and a MPU 140 of the storage control apparatus 100 controls the management device 106, and invites the user to set each RAID group and spare HDD for it within the same additional storage unit 150. In the following, the structure of this storage control apparatus 100 will be explained in more concrete terms.

As shown in FIG. 1, the storage control apparatus 100 is connected to one or more external host devices 102 so as to be capable of communication therewith, for example via a SAN (Storage Area Network) 104, and, in response to requests from the host device 102, stores data from the host device 102 and outputs stored data to the host device 102. Moreover, the storage control apparatus 100 is connected to a management device 106 which is actuated by the user so as to be capable of communication therewith, for example via a LAN (Local Area Network) 108, and receives various types of setting command from the management device 106, as will be described hereinafter.

The storage control apparatus 100 comprises a control device 120 and a base storage unit 124, and these are the minimum essential structural elements of this storage control apparatus 100. The control device 120 is contained within a dedicated chassis 122. The base storage unit 124 is also contained within a dedicated chassis 126. These chassis 122 and 126 will hereinafter be termed the base chassis.

The storage control apparatus further comprises one or more power distribution boxes (hereinafter abbreviated as "PDBs") 160 for supplying power to the control device 120 and the base storage unit 124. Each of the PDBs 160 is contained within a dedicated chassis 162. And each of the PDBs 160 is connected to the control device 120 via a LAN hub 164, and is controlled by the control device 120.

In order to handle the case in which the storage capacity offered only by the base storage unit 124 is not sufficient, it is possible to add one or more additional storage units 160 to this storage control apparatus 100. While in FIG. 1 only a single such additional storage unit 150 is shown, in FIGS. 2A and 2B a plurality of additional storage units 150 are shown. These additional storage units 150 are contained within individual dedicated chassis 152 (hereinafter termed "additional chassis").

If as described above one or more additional storage units 150 are added, then one or more switchable power distribution boxes 170 (hereinafter abbreviated as "SWPDBs") for supplying power to each of these additional storage units 150 individually, and one or more back end switches 180 (hereinafter abbreviated as "BESWs") for connecting those additional storage units 150 individually to the control device 120 so as to be capable of communication therewith, are also additionally provided. Each of these SWPDBs 170 is contained within its own dedicated chassis 172. And each of the BESWs 170 is contained within its own dedicated chassis 182.

Each of the SWPDBs 170 can be individually turned ON and OFF. To put it in another manner, the power supply to each of the additional storage units 150 can be individually turned ON and OFF. Each of the SWPDBs 170 is connected to the control device 120 via a LAN hub 164, and its turning ON and OFF are controlled by the control device 120.

As shown in FIG. 2A, a plurality of chassis 122, 126, 152, 162, 172, and 182, each of which contains structural elements of the storage control apparatus 100 as described above, are contained within one overall chassis 190

As shown in FIG. 1, the base storage unit 124 comprises a plurality of storage devices 130. Each of the additional storage units 150 also comprises a plurality of storage devices 154. In this embodiment, each of the storage devices 130 and 154 is, by way of example, taken as being a hard disk drive (hereinafter abbreviated as a "HDD"), but this is not limitative of the present invention; for example, if flash memories or the like are used instead of HDDs, this is also considered as being included within the scope of the present invention. In this embodiment, within the base storage unit 124 and the additional storage units 150, according to the RAID 5 technique, there are established a number of RAID groups as desired by the user (the HDDs which make up these RAID groups are hereinafter termed "data HDDs"), and, for example, for each of these RAID groups, there is also provided a single HDD (hereinafter termed a "spare HDD") which constitutes a single spare storage device.

The control device 120 comprises one or more host interfaces for communicating with the host devices 102, one or more LAN interfaces 134 for communicating with the management device 106, the PDBs 160, and the SWPDBs 170 via the LAN 108, one or more device interfaces 136 for communicating with the HDDs 130 and 154, one or more cache memories 138 which temporarily store data inputted and outputted to and from the HDDs 130 and 154, one or more MPUs 140 which perform various types of calculation processing for controlling the operation of the storage control apparatus 100, one or more program memories 142 which store computer programs used by the MPUs 140 and tables of various types, and one or more data transfer circuits 144 which transfer data between various previously described elements within the control device 120.

Figure 3:
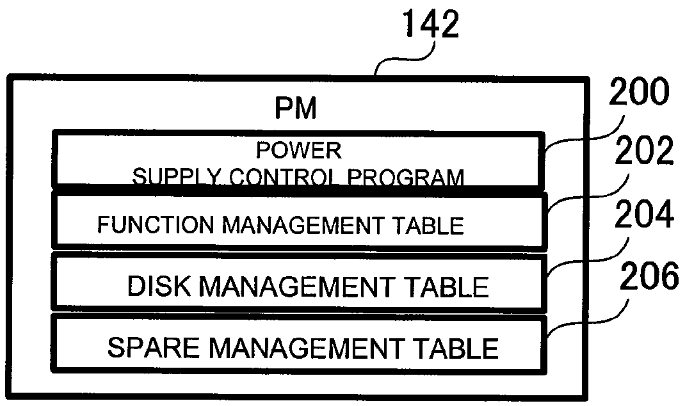
FIG. 3 is a figure showing a computer program and a plurality of data tables related to the present invention, which are stored in a program memory 142.

FIG. 3 shows a computer program and a plurality of data tables related to the present invention, which are stored in the program memory 142.

As shown in FIG. 3, a power supply control program 200 is stored in this program memory 142, and this is a computer program for the MPU 140 to perform control by the MAID technique for economization of the usage of electrical power, according to the theory of the present invention. Moreover, a function management table 202, a disk management table 204, and a spare management table 206 are stored in the program memory 142, and these are utilized by the MPU 140 when executing the power supply control program 200.

FIG. 4 shows an example of the contents of the function management table 202.

As shown in FIG. 4, in this function management table 202, there are set two flags which respectively indicate whether each of two power economization functions with which this storage control apparatus 100 is endowed, i.e. drive spin control and additional chassis power supply control, is currently valid or invalid. Here, drive spin control is a type of control in which each of the large number of HDDs 130 and 154 included in this storage control apparatus 100 is individually spun up and spun down. And additional unit power supply control is a type of control in which the power supply to each of the one or more additional storage units 152 fitted to the storage control apparatus 100 is individually turned ON or OFF. In this embodiment, since each of the additional storage units 152 is contained within its own individual additional chassis 152, accordingly this additional unit power supply control means turning ON and OFF of the power supply to each of these additional chassis 152 individually. However this is not to be considered as being limitative of the scope of the present invention; for example, the case in which a large number of additional chassis 152 are divided into two or more groups whose number is smaller than the number of those chassis 152, and control is performed so as to turn the supply of power individually ON and OFF to each of these groups individually, is also to be considered as falling within the scope of the present invention.

If the drive spin control flag is set to valid in the function management table 202, then the MPU 140 performs drive spin control, whereas if this flag is set to invalid, then the MPU 140 does not perform drive spin control. In a similar manner, if the additional unit power supply control flag is set to valid in the function management table 202, then the MPU 140 performs drive spin control, whereas if this flag is set to invalid, then the MPU 140 does not perform additional unit power supply control.

In this embodiment, the power economization function settings in the function management table 202, i.e. whether drive spin control and additional unit power supply are valid or not, are applied to all of the storage units 124 and 150 in the storage control apparatus 100 together, However this is not to be considered as being limitative of the scope of the present invention; if, for example, it were to be arranged to perform setting of these power economization functions individually for each storage unit, then this would also be considered to fall within the scope of the present invention.

FIG. 5 shows an example of the contents of the spare management table 206.

As shown in FIG. 5, in this spare management table 206, flags are set which indicate, if a breakdown has taken place in an HDD 130 or 154 which is included in any one of the RAID groups in the storage control apparatus 100, which of copy-back or copy-backless is to be used in the processing for recovering that RAID group from breakdown. Either the copy-back flag is set to valid and the copy-backless flag is set to invalid, or the copy-back flag is set to invalid and the copy-backless flag is set to valid. Here, as already explained, "copy-back" and "copy-backless" mean the following recovery processing procedures.

(1) Copy-Back

Data which is the same as the storage data in the HDD which failed in this RAID group is recovered upon the spare HDD. After the failed HDD is exchanged for a new HDD, the recovered data upon the spare HDD is copied back to the new HDD. And this new HDD is installed to this RAID group as a new data HDD.

(2) Copy-Backless

Data which is the same as the storage data in the HDD which failed in this RAID group is recovered upon the spare HDD. And this spare HDD is installed to this RAID group as a new data HDD. The new HDD which has been exchanged with the HDD which failed is used as a new spare HDD for this RAID group.

In this embodiment, the recovery processing setting in the spare management table 206, in which either copy-back or copy-backless is selected, is applied to all of the storage units 124 and 150 in the storage control apparatus 100 together, However this is not to be considered as being limitative of the scope of the present invention; if, for example, it were to be arranged to set this recovery processing setting individually for each storage unit, then this would also be considered to fall within the scope of the present invention.

FIGS. 6A and 6B show two examples of the contents of the disk management table 204. FIG. 6A shows an example of the contents of the disk management table 204 in its initial state, in which no settings have been made for RAID groups or spare HDDs, while FIG. 6B shows an example of the contents of the disk management table 204, after settings for several RAID groups and their spare HDDs have been made.

As shown in FIGS. 6A and 6B, detailed information for the base storage unit 124 and for each of the one or more additional storage units 150 which are mounted to the storage control apparatus 100 is registered in this disk management table 204. This detailed information which is thus registered may be, for example, the identification number of the chassis which contains each of the storage units 124 and 150, the identification number of each of the plurality of HDDs 130 and 154 which is fitted in each of the storage units 124 and 150, the capacity of each of these HDDs 130 and 154, the identification number of each of the RAID groups which has been set (in the figure, "RAID group" is abbreviated as "RG"), which are the two or more data HDDs which make up each RAID group, which is the spare HDD for each RAID group, and the like.

In the following, the operation of the storage control apparatus 100 according to the theory of the present invention will be explained.

Figure 7:
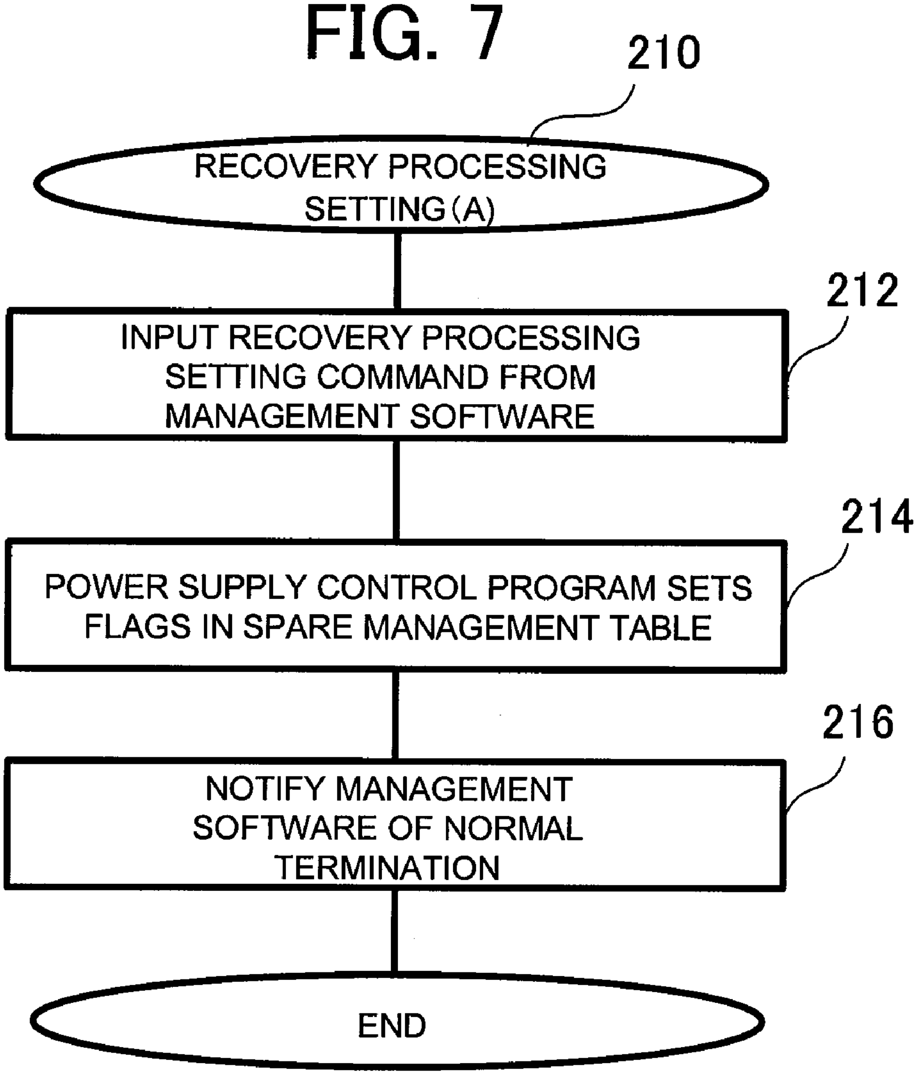
FIG. 7 is a flow chart showing the flow of setting 210 related to recovery processing.

FIG. 7 shows the flow of setting 210 related to recovery processing.

As shown in FIG. 7, in a step 212, the management software 110 in the management device 106 inputs from the user a recovery processing setting command which specifies either copy-back or copy-backless as the recovery processing from breakdown of a raid group which utilizes a spare HDD. This recovery processing setting command is transmitted from the management software 110 via the LAN interface 134 and the data transfer circuit 144, and is received by the power supply control program 200 in the MPU 140.

In the next step 214, according to this recovery processing setting command, the power supply control program 200 sets the flags in the spare management table 206 to valid/invalid according to the type of recovery programming which has been designated (either copy-back or copy-backless).

And in a step 216 the power supply control program 200 notifies the management software 110, via the data transfer circuit 144 and the LAN interface 134, of the status of normal termination.

Figure 8:
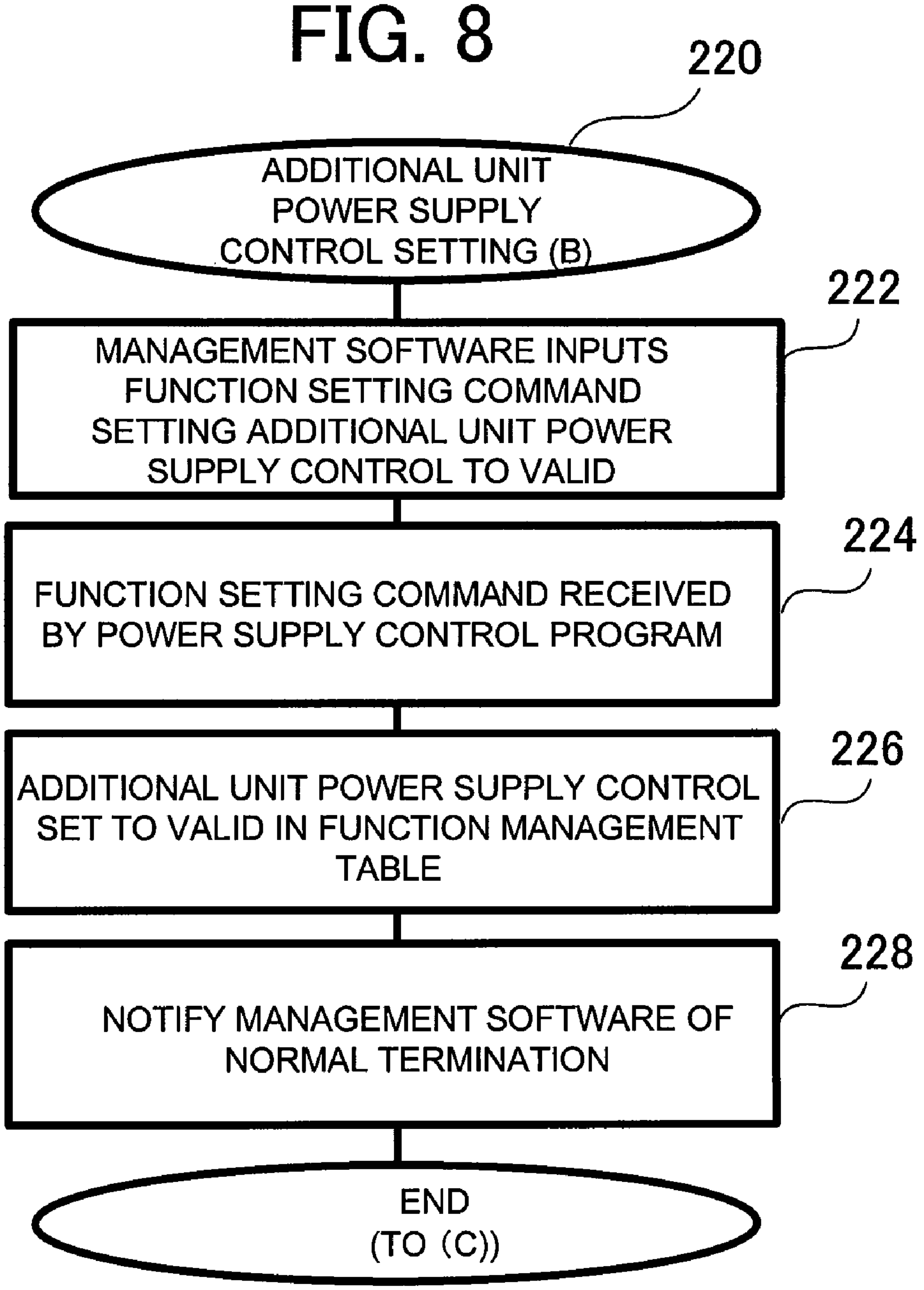
FIG. 8 is a flow chart showing the flow of additional unit power supply control setting 220.

FIG. 8 shows the flow of additional unit power supply control setting 220.

As shown in FIG. 8, in a step 222, the management software 100 upon the management device 106 inputs a function setting command from the user which specifies that the additional unit power supply control function for individually turning the power supply for each of the additional units 1500N and OFF is to be made valid.

And in a step 224 this function setting command is transmitted from the management software 110, and is received by the power supply control program 200 of the MPU 140 via the LAN interface 134 and the data transfer circuit 144.

Then in a step 226, according to this function setting command, the power supply control program 200 sets the flag for additional unit power supply control in the function management table 202 to valid.

Finally in a step 228 the power supply control program 200 notifies the management software 110 via the data transfer circuit 144 and the LAN interface 134 of the normal termination status.

It should be understood that, if the additional unit power supply control is to be set to invalid, then, whether the drive spin control is set to valid or to invalid, the flow of the processing is the same as that described above, except for the feature that the command item in the function setting command is different.

After the additional unit power supply control has been set to valid as described above, the processing shown in FIG. 9 for checking the installation states of the HDDs 134 and 150 is performed automatically.

Figure 9:
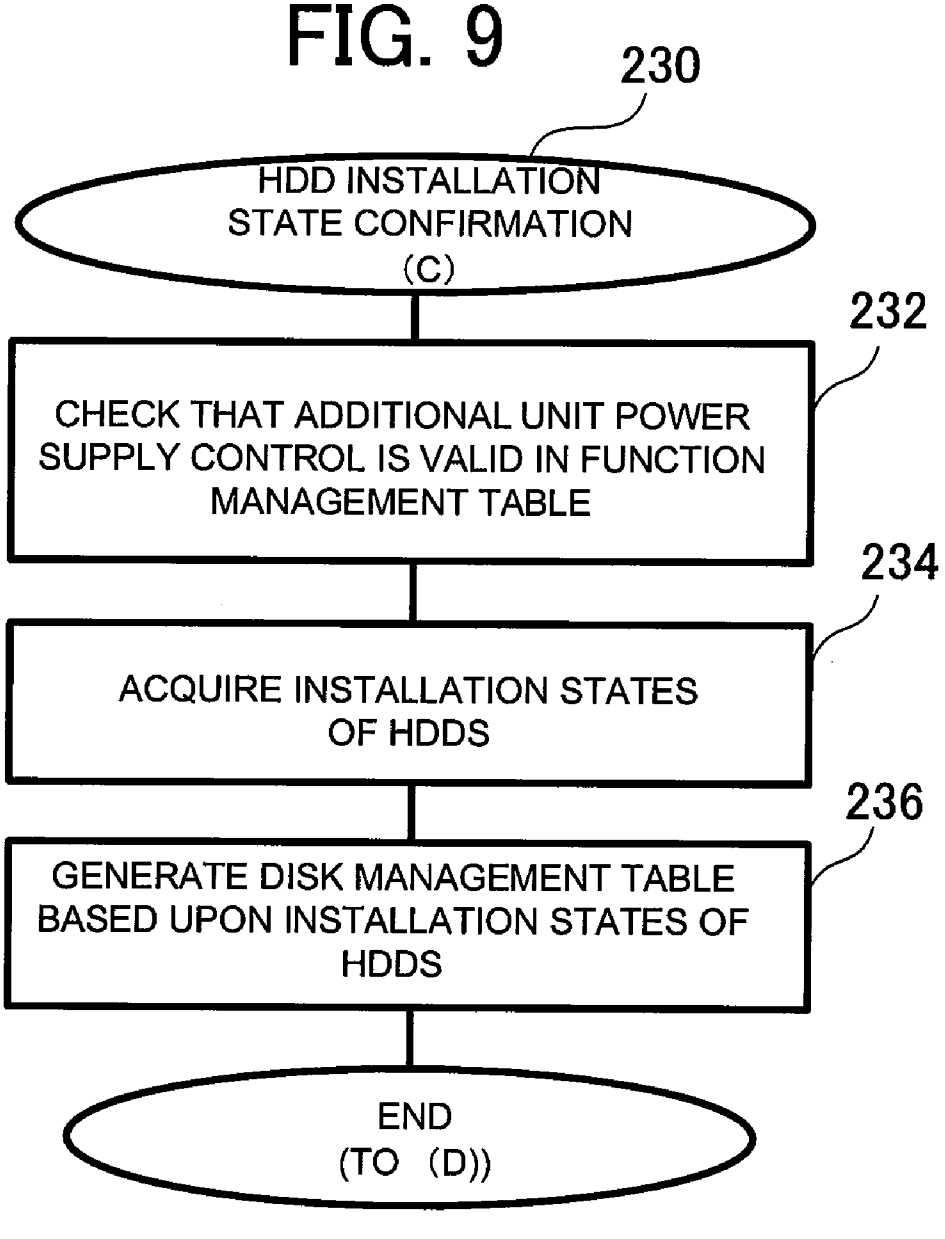
FIG. 9 is a flow chart showing the flow of HDD installation state confirmation 230.

As shown in FIG. 9, in a step 232, the power supply control program 200 refers to the function management table 202, and checks that the additional unit power supply control has become valid.

Then in a step 234 the power supply control program 200 acquires, via the device interface 136, information as to the installation state of each and all of the HDDs 130 and 154 in the base storage unit 124 and all of the additional storage units 150. Here, this information as to the installation state of each of the HDDs is the information which is to be registered in the disk management table 204, for example, the identification number of each of the HDDS, the capacity of each of the HDDs, the identification number of the chassis 126 or 152 of the storage unit 124 or 150 in which each of the HDDs is installed, and the like.

Finally in a step 236 the power supply control program 200 generates the disk management table 204, as shown by way of example in FIG. 6A, on the basis of the information as to the installation state of all of the HDDs 130 and 154 which was acquired in the previous step 234.

Figure 10A:
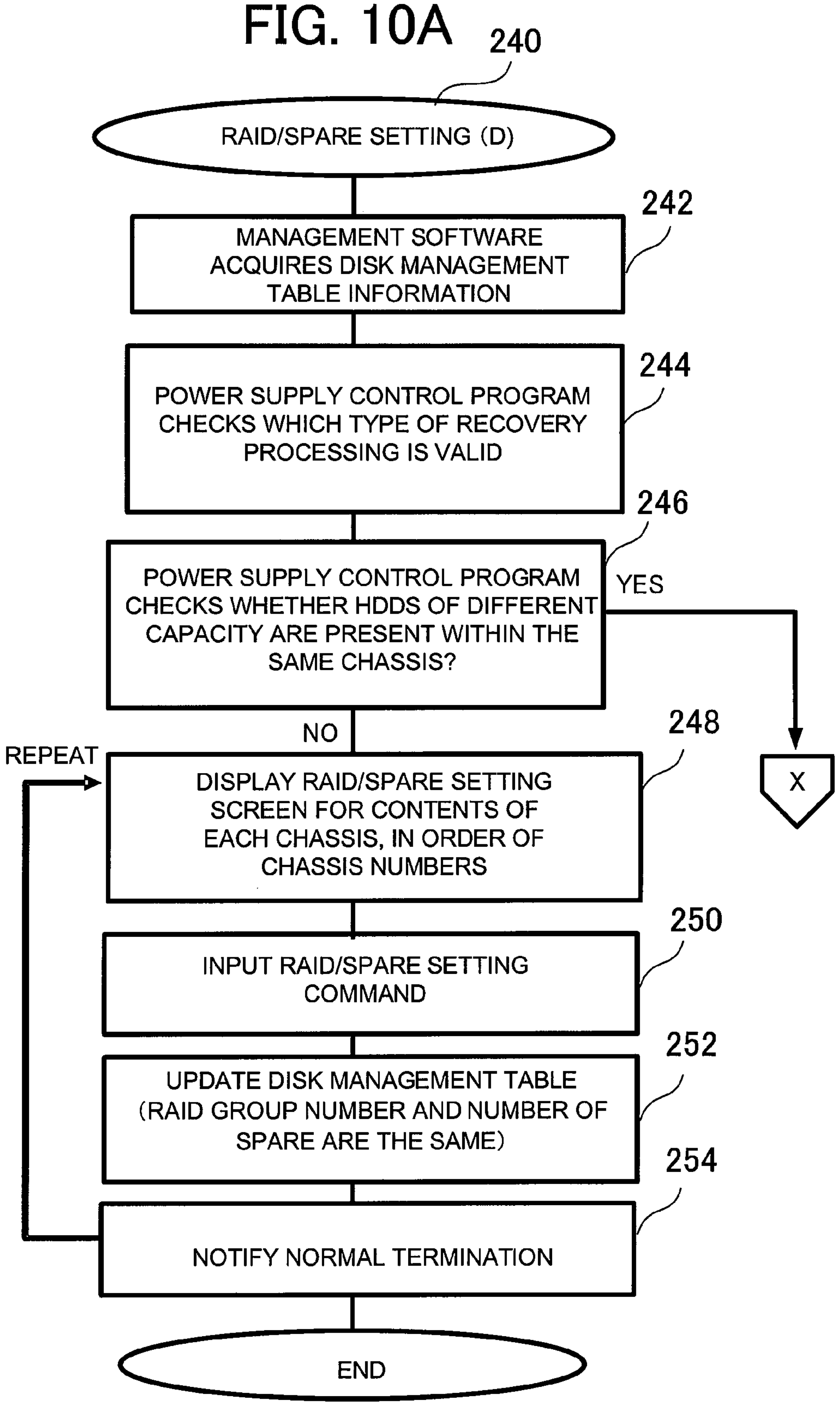
FIG. 10A is a flow chart showing the flow of RAID/spare setting 240.
Figure 10B:
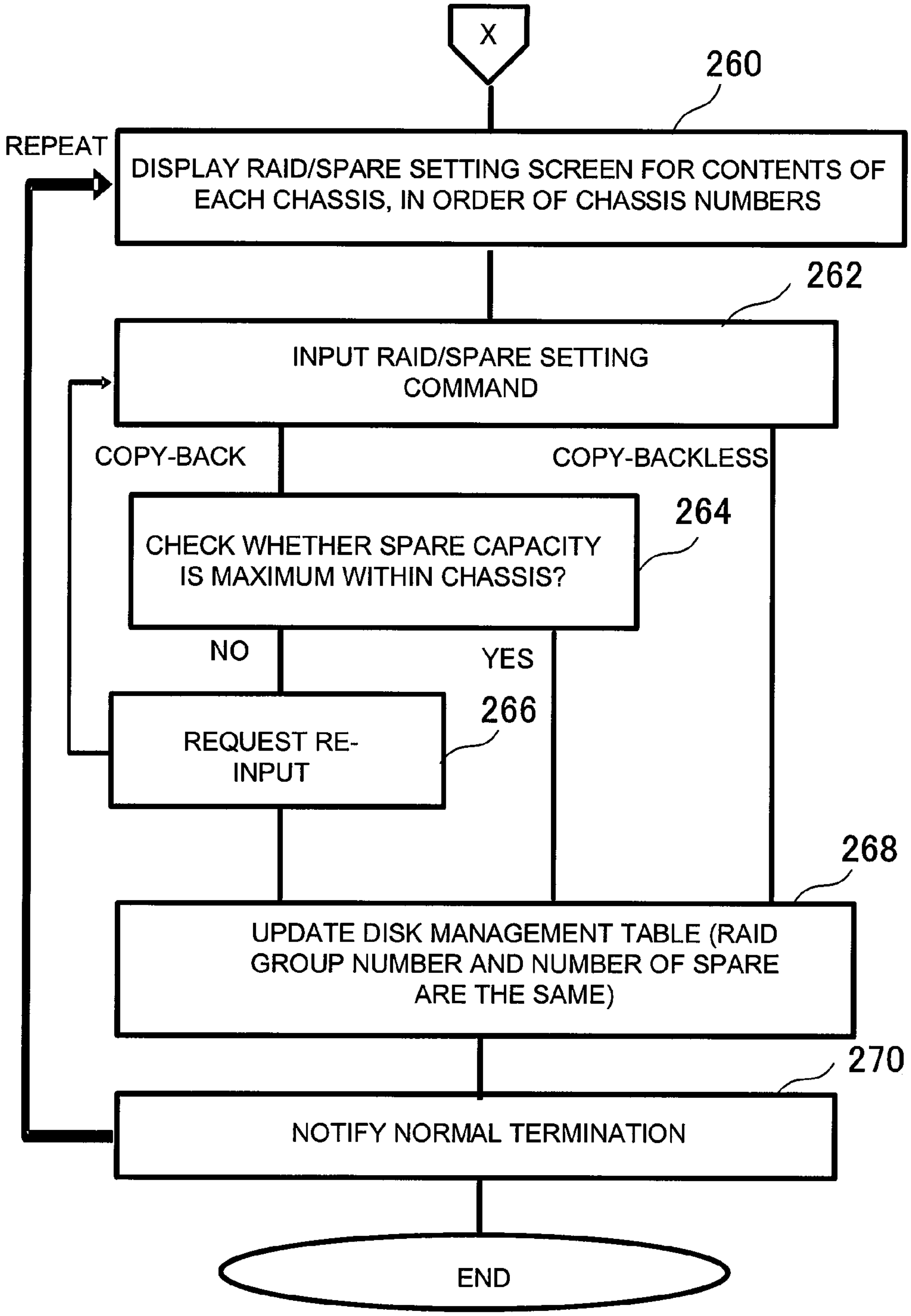
FIG. 10B is another flow chart showing the flow of RAID/spare setting 240.

After the disk management table 204 has been generated in this manner, settings are made for the RAID groups and the spare HDDs (hereinafter these will be termed the RAID/spare settings), as shown in FIGS. 10A and 10B.

As shown in FIG. 10A, in a step 242, the management software 110 upon the management device 106 acquires the registered information in the disk management table 204 from the power supply control program 200, via the LAN interface 134. At this time, the information that the additional unit power supply control which was checked in the step 232 of FIG. 9 described above is valid is also notified to the management software 110 from the power supply control program 200.

In a step 244, the power supply control program 200 refers to the spare management table 206, and checks which of copy-back and copy-backless for the recovery processing type is set to valid.

In a step 246, the power supply control program 200 refers to the disk management table 204, and investigates the capacities of the HDDs within each of the storage units 130 and 150 in order from the smallest chassis identification number, and checks whether or not two or more HDDs of different storage capacities are present for the same chassis identification number (i.e. for the same storage unit).

If the result of the check in the step 246 described above is NO (i.e. if the capacities of all of the HDDs which are present in the same chassis, i.e. the same storage unit, are the same), then the flow of control proceeds to a step 248.

In the step 248, on the basis of the information in the disk management table 204, the management software 110 upon the management device 106 generates a RAID/spare setting screen, and displays this upon the display screen of the management device 106. At this time, the management software 110 generates the RAID/spare setting screen by the following procedure, in response to the information notified in the step 242 described above that the additional unit power supply control is valid.

That is, the management software 110 selects one each of the storage units 130 and 150 in order from those whose chassis identification numbers are the smallest, and generates and displays a RAID/spare setting screen for performing RAID/spare settings only within the single chassis, i.e. within the single storage units, that have been selected.

Figure 11:
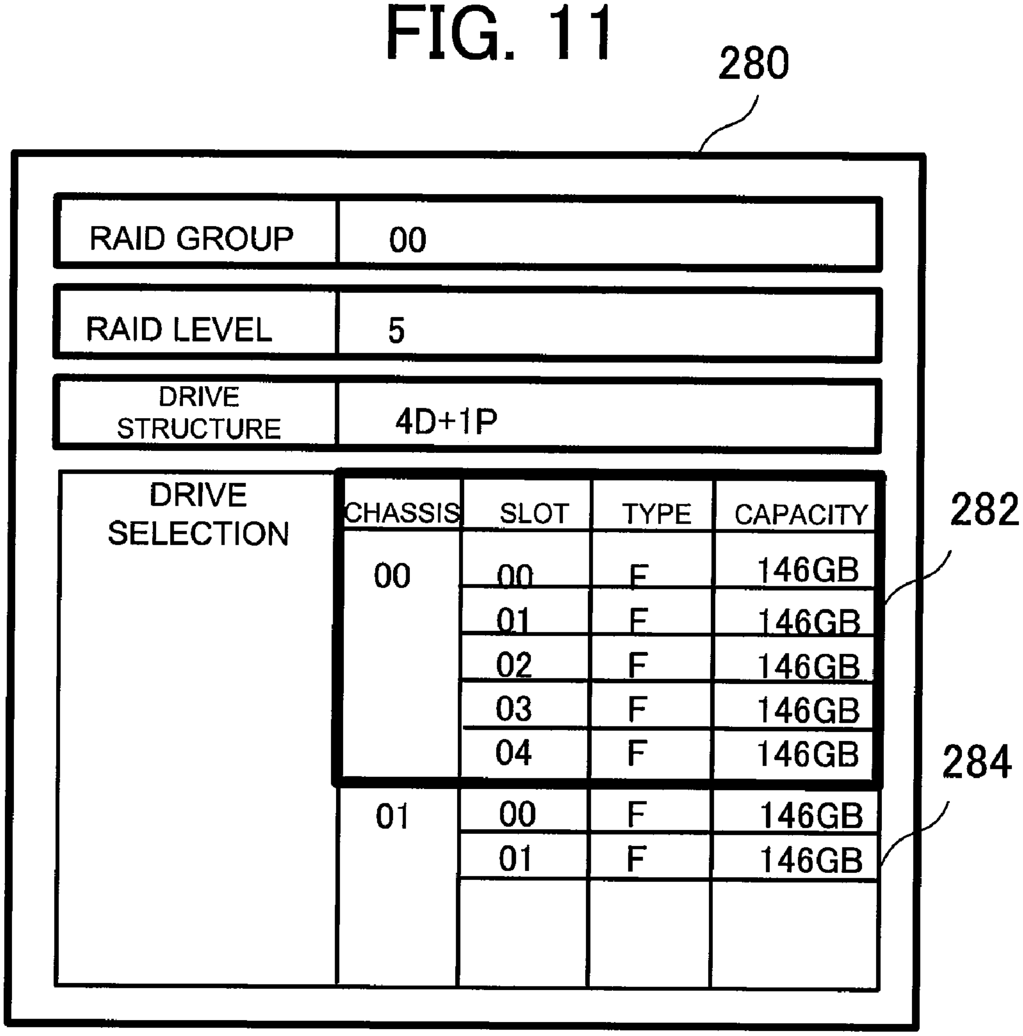
FIG. 11 is a figure showing an example of a RAID/spare setting screen 280.

FIG. 11 shows an example of the RAID/spare setting screen 280 which is generated in this manner and displayed.

As shown in FIG. 11, on this RAID/spare setting screen 280, only the display region 282 for a single chassis, i.e. for a single storage unit, which has been selected (in the example of FIG. 11, the display region 282 for the chassis number "00") is made active, and it is possible to designate a plurality of data HDDs to constitute a RAID group, and a spare HDD for this RAID group, only upon this active display region 282, in other words only within the single chassis which has been selected, i.e. only within the single storage unit which has been selected. On the other hand, the display regions 284 for all of the other storage units which are not selected (in the example of FIG. 11, the display region 284 for the chassis number "01") are inactive, so that it is not possible to designate a data HDD or a spare HDD from those regions.

In a step 250, the management software 110 inputs from the user a RAID setting command which designates a plurality of data HDDs to make up a RAID group with some identification number, and a spare setting command which designates at least a single spare HDD for that RAID group. At this time, the user is able to designate the above described plurality of data HDDs and the above described at least a single spare HDD only upon the active display region 282 upon the RAID/spare setting screen 280 such as that shown by way of example in FIG. 11. Accordingly, the above described plurality of data HDDs and the above described at least a single spare HDD which are designated by the RAID setting command and the spare setting command must absolutely only be present within the single chassis which has been selected, i.e. within the single storage unit which has been selected.

This RAID setting command and spare setting command (hereinafter these commands will be termed the "RAID/spare setting commands") are transmitted from the management software 110 via the LAN interface 134 and the data transfer circuit 144, and are received by the power supply control program 200 upon the MPU 140.

Then in a step 252 the power supply control program 200 updates the disk management table 204 according to these RAID/spare setting commands. In other words, as shown in FIG. 6B, the power supply control program 200 registers this RAID group identification number to the plurality of data HDDs which are designated by the RAID setting command, and registers a RAID group identification number which is the same to the spare HDD which is commanded by the spare setting command. By doing this, a single RAID group and a spare HDD for that RAID group are set within the same chassis, i.e. within the same storage unit.

In a step 254, the power supply control program 200 notifies the management software 110 via the data transfer circuit 144 and the LAN interface 134 of the status of normal termination.

The steps 248 through 254 described above are repeated for each of the storage units 124 and 150.

If the result of the check in the step 246 described above is YES (i.e. if HDDs of different capacities are present within some same chassis, i.e. within some same storage unit), then the flow of control is transferred to the step 260 shown in FIG. 10B.

As shown in FIG. 10B, in the step 260, the management software 110 upon the management device 106 performs similar processing to that of the step 248 of FIG. 10A, and generates and displays a RAID/spare setting screen such as the one shown by way of example in FIG. 11.

In a step 262 similar processing is performed to that of the step 250 of FIG. 10A, and thereby RAID/spare setting commands which have been inputted from the user are transmitted from the management software and received by the power supply control program 200. And the power supply control program 200 refers to the result of checking in the step 244 of FIG. 10A, and checks which of copy-back and copy-backless for the recovery program is set to valid.

If copy-back is set to be valid, then the flow of control proceeds to a step 264. In this step 264, the power supply control program 200 refers to the disk management table 204, and checks whether the spare HDD which was designated by the spare setting command is an HDD having the maximum capacity within the single chassis which has been selected, in other words within the single storage unit that has been selected.

If the result of this checking is NO, then in a step 266 the power supply control program 200 feeds back a re-input request to the management software 110, asking for the selection to be re-done and for an HDD of the maximum capacity to be selected as the spare HDD. As a result, the flow of control returns to the step 262. The reason for performing this type of control is that, if the capacity of the spare HDD is not the maximum, then there is a fear of the problem arising that this spare HDD cannot be used for recovery from a breakdown, since its capacity is smaller than the capacity of at least one of the data HDDs that might break down.

If the result of the check in the step 264 described above is YES (i.e. if the spare HDD which has been designated is an HDD which has the maximum capacity), then the flow of control proceeds to a step 268. On the other hand, if the result of the decision in the step 262 described above is that copy-backless is valid, then in any case the flow of control proceeds to the step 268.

In the step 268, the power supply control program 200 performs similar processing to that of the step 252 of FIG. 10A. In other words, the power supply control program 200 updates the disk management table 204 according to the RAID/spare setting command.

In a step 270, the power supply control program 200 notifies the management software 110 via the data transfer circuit 144 and the LAN interface 134 of the status of normal termination.

The steps 260 through 270 described above are repeated for each of the storage units 124 and 150.

According to the RAID/spare setting 240 shown in FIGS. 10A and 10B, if the additional unit power supply control is set to be valid, the plurality of data HDDs which constitute each RAID group and the installation position of the spare HDD for that RAID group must absolutely always be limited to being within the same storage unit 134 or 150. As a result, as compared with the prior art technique in which it was possible for the user to determine the installation positions of the data HDDs and the spare HDDs freely, whether copy-back is set or copy-backless is set, the opportunities for being able to turn OFF the power supply to each of the additional storage units 150 individually are increased, and thereby the advantageous effect for economization of electrical power is enhanced.

It should be understood that, in this embodiment, it may be arranged, if the additional unit power supply control function is not set to valid, for the installation positions of the data HDDs and the spare HDDs to be determined freely as the user wishes, i.e. according to the prior art technique.

Figure 12:
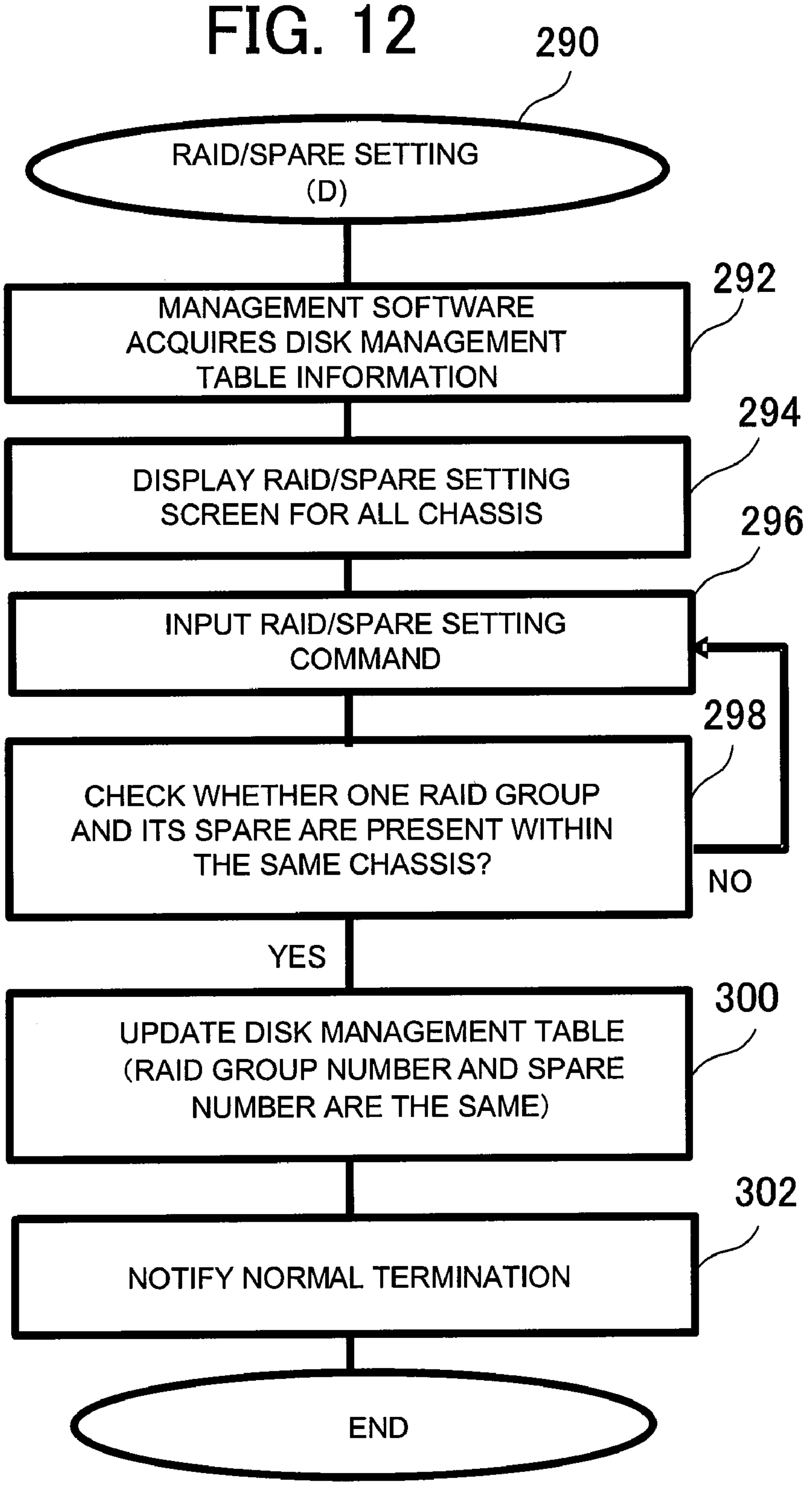
FIG. 12 is a flow chart showing the flow of RAID/spare setting 290 according to another method.

FIG. 12 shows the flow of RAID/spare setting 290 according to a different method, which may be employed instead of the RAID/spare setting 240 shown in FIGS. 10A and 10B and described above.

As shown in FIG. 12, in a step 292, the management software 110 upon the management device 106 acquires the registered information in the disk management table 204 from the power supply control program 200 via the LAN interface 134.

And, in a step 294, on the basis of the information in the disk management table 204, the management software 110 generates a RAID/spare setting screen, and displays it upon the display screen of the management device 106. As shown in FIG. 11, the RAID/spare setting screen which is generated and displayed at this time is not one in which it is only permitted to make RAID/spare settings within the single storage unit which has been selected, but is one upon which it is possible to designate any desired data HDDs and spare HDDs, from among all of the HDDs 130 and 154 within all of the chassis, i.e. within all of the storage units 124 and 150.

In a step 296, the management software 110 inputs from the user RAID/spare setting commands which designate a plurality of data HDDs which make up each of all of the RAID groups which the user desires, and at least a single spare HDD for each of these RAID groups. At this time, the user can designate any desired data HDDs and spare HDDs that he desires from among all of the HDDs 130 and 154 upon the RAID/spare setting screen 280 which was displayed in the step 294. These RAID/spare setting commands which have been inputted are transmitted from the management software 110 and are received by the power supply control program 200.

In a step 298, in response to the information that the additional unit power supply control is set to be valid, which has been confirmed in the step 232 of FIG. 9 described previously, the power supply control program 200 performs control as follows: that is, the power supply control program 200 checks whether or not the plurality of data HDDs which make up each of the RAID groups designated by the RAID/spare setting command which has been received, and the spare HDD for that RAID group, are present within the same chassis, in other words are present within the same storage unit. If the result of this check is NO, then the power supply control program 200 feeds back a re-input command to the management software 110, asking the user to designate the above described data HDDs and spare HDD from within the same chassis, i.e. from within the same storage unit. Due to this, the flow of control returns to the step 296.

On the other hand, if the result of the check in the step 298 described above is YES, then the flow of control proceeds to a step 300. In this step 300, the power supply control program 200 updates the disk management table 204 according to the above described RAID/spare setting command. In other words, as shown in the example of FIG. 6B, the power supply control program 200 registers this RAID group identification number to the plurality of data HDDs which were designated by the RAID setting command, and register the same RAID group identification number to the spare HDD which was commanded by the spare setting command. By doing this, a single RAID group and the spare HDD for that RAID group come to be set within the same chassis, in other words within the same storage unit.

And, in a step 302, the power supply control program 200 notifies the management software 110 via the data transfer circuit 144 and the LAN interface 134 of the status of normal termination.

According to this RAID/spare setting 290 shown in the above described FIG. 12 as well, if the additional unit power supply control is set to valid, then the installation positions of the plurality of data HDDs which make up each RAID group, and the installation position of the spare HDD for that RAID group, are unavoidably limited to being within the same storage unit 134 or 150. As a result, as compared with the prior art technique in which it was possible for the user to determine the installation positions of the data HDDs and the spare HDDs freely, whether copy-back is set or copy-backless is set, the opportunities for being able to turn OFF the power supply to each of the additional storage units 150 individually are increased, and thereby the advantageous effect for economization of electrical power is enhanced.

Now, if the additional unit power supply control setting 220 shown in the above described FIG. 8 was made before the operation of the storage control apparatus 100 was started (in other words when no valid data was being stored in any of the HDDs 130 and 154), then it is desirable for the RAID/spare setting 240 or 290 shown in the above described FIGS. 10A and 10B, or in FIG. 12, to be performed after this additional unit power supply control setting 220. However if, after the operation of the storage control apparatus 100 has been temporarily started in the state in which the additional unit power supply control has been set to be invalid, subsequently the additional unit power supply control setting 220 shown in FIG. 8 is made, so that the additional unit power supply control is changed over from invalid to valid, then it is difficult to perform the RAID/spare setting 240 or 290 shown in the above described FIGS. 10A and 10B, or in FIG. 12. The reason why is that there is a possibility that already valid data for the same RAID group may be stored by being dispersed in different storage units. Accordingly, in this case, in this embodiment, an additional unit power supply control supplementary setting 310 is performed, as shown in FIG. 13.

Figure 13:
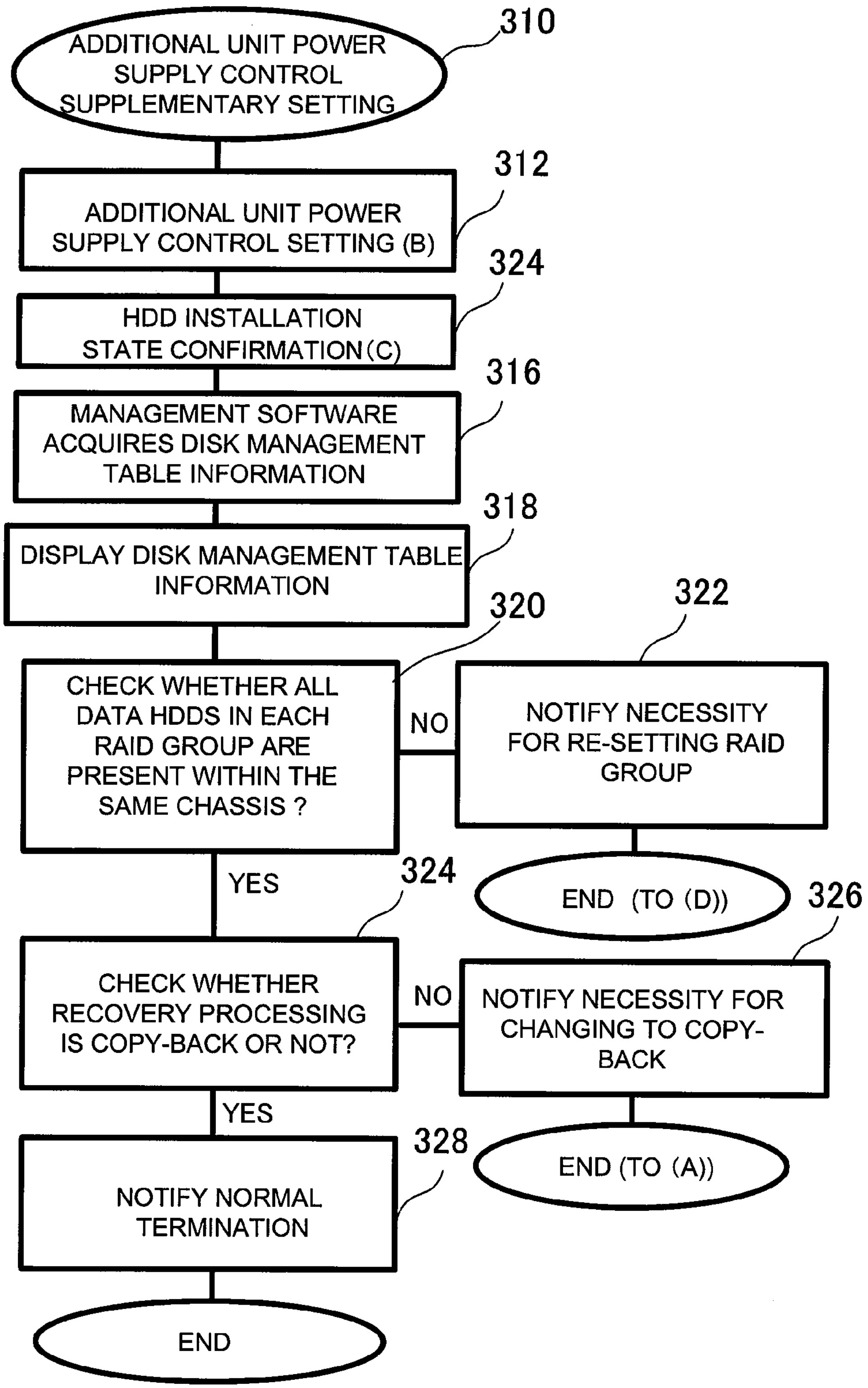
FIG. 13 is a flow chart showing the flow of additional unit power supply control supplementary setting 310.

As shown in FIG. 13, in a step 312, after the operation of the storage control apparatus 100 has been temporarily started in the state in which the additional unit power supply control has been set to be invalid, the additional unit power supply control setting 220 shown in FIG. 8 is made, so that the additional unit power supply control is changed over from invalid to valid.

And, in a step 314, an HDD installation state confirmation 230 shown in FIG. 9 is performed, and a disk management table 204 like the one shown by way of example in FIG. 6A is generated.

In a step 316, the management software 110 upon the management device 106 acquires the registered information in the disk management table 204 from the power supply control program 200 via the LAN interface 134.

In a step 318, the management software 110 displays the information in the disk management table 204 upon the display screen of the management device 106.

And, in a step 320, the power supply control program 200 refers to the disk management table 204, and, for each RAID group, checks whether or not the plurality of data HDDs which make up that RAID group are present within the same chassis, in other words within the same storage unit.

If the result of the check in the step 320 described above is NO for any one of the RAID groups, then in a step 322 the power supply control program 200 notifies the management software 110 of the necessity to re-set the plurality of data HDDs which make up this RAID group in the same chassis, in other words in the same storage unit. By doing this, the RAID/spare setting 240 or 290 shown in the above described FIGS. 10A and 10B, or FIG. 12, comes to be performed. However, the portion within the RAID/spare setting 240 or 290 in which the spare HDD is set is not performed; only the portion in which the data HDDs for this RAID group are set to be within the same storage unit is performed. Why this is, is because, even if just the data HDDs for this RAID group are present within the same storage unit, and even if the spare HDD is present within some other storage unit, provided that copy-backless is not set to be valid as the recovery processing, then the advantageous effect to economize upon electrical power due to the additional unit power supply control will be enhanced over the case in the prior art.

If the result of the check in the step 320 described above is YES for all of the RAID groups, then in a step 324 the power supply control program 200 refers to the spare management table 206, and checks whether or not copy-back is valid for the recovery processing.

If the result of the check in the step 320 described above is NO (and if copy-backless is valid), then in a step 326 the power supply control program 200 notifies the management software 110 that it is necessary to change the valid recovery processing from copy-backless to copy-back. By doing this, the above described recovery processing setting 210 shown in FIG. 7 is performed, and the setting change comes to be made for copy-back to become valid.

If the result of the check in the step 320 described above is NO (and if copy-back is valid), then in a step 328 the power supply control program 200 notifies the management software 110 via the data transfer circuit 144 and the LAN interface 134 of the status of normal termination.

Figure 14:
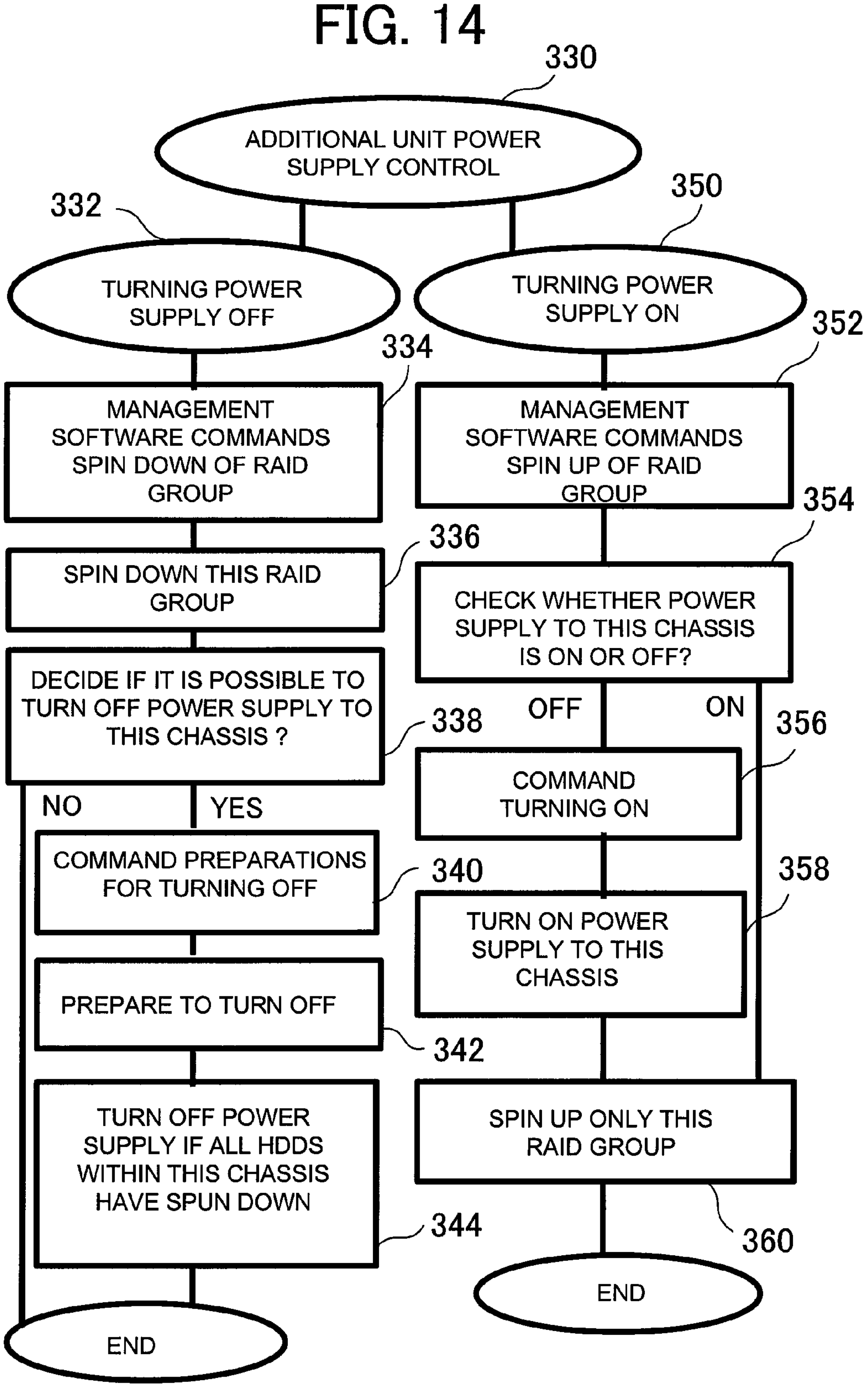
FIG. 14 is a flow chart showing the flow of additional unit power supply control 330.

FIG. 14 shows the flow of additional unit power supply control 330. This additional unit power supply control 330 is executed when, in the function setting table 202, both drive spin control and additional unit power supply control are set to be valid.

As shown in FIG. 14, in the additional unit power supply control 330, there are included two processes: power supply turning OFF 332 and power supply turning ON 350.

First, the power supply turning OFF 332 will be explained. In a step 334, the management software 110 designates some desired RAID group in some additional chassis 152, in other words within some additional storage unit 150, and transmits to the power supply control program 200 a spin down command which requests the spinning down of that RAID group.

In a step 336, the power supply control program 200 spins down the data HDDs which make up the designated RAID group and the spare HDD for that RAID group.

In a step 338, the power supply control program 200 decides whether or not it is possible to turn OFF the power supply to the additional chassis 152, in other words to the additional storage unit 150, in which that RAID group is present (for example, whether or not all of the HDDs 154 within that additional chassis 152, in other words within that additional storage unit 150, have been accessed during some predetermined time period in the recent past).

If the result of the decision in the step 338 described above is that it is possible to turn OFF the power supply to this additional chassis 152, in other words to this additional storage unit 150, then in a step 340 the power supply control program 200 issues a command to a back end control program (not shown in the drawings) which is executed by the MPU 140, to perform preparations for turning OFF the power supply to this additional chassis 152, in other words to this additional storage unit 150.

In a step 342, in response to the above described command, the above described back end control program performs preparations for turning OFF the power supply to this additional chassis 152, in other words to this additional storage unit 150 (for example, it spins down all of the HDDs 154 within this additional chassis 152, in other words within this additional storage unit 150).

And in a step 344, if all of the HDDs 154 within this additional chassis 152, in other words within this additional storage unit 150, have reached the spun down state, then the power supply control program 200 issues a command to the SWPDB 170 of this additional chassis 152, in other words of this additional storage unit 150, to turn the power supply to this additional chassis 152, in other words to this additional storage unit 150, OFF.

Next, the power supply turning ON 350 will be explained. In a step 352, the management software 110 designates a desired RAID group within some additional chassis 152, in other words within some additional storage unit 150, and transmits to the power supply control program a spin up command, which requests the spinning up of this RAID group.

In a step 354, the power supply control program 200 makes a decision as to whether the power supply to the additional chassis 152, in other words to the additional storage unit 150, in which the designated RAID group is present, is in the ON state or in the OFF state. If the result of this decision is that the power supply of this additional chassis 152, in other words of this additional storage unit 150, is in the ON state, then the flow of control proceeds to a step 360.

On the other hand, if the result of the decision in the step 354 is that the power supply of this additional chassis 152, in other words of this additional storage unit 150, is in the OFF state, then in a step 356 the power supply control program 200 commands the SWPDB 170 of this additional chassis 152, in other words of this additional storage unit 150, to turn ON the power supply to this additional chassis 152, in other words to this additional storage unit 150.

And in a step 358, in response to the above described event, this SWPDB 170 turns ON the power supply to this additional chassis 152, in other words to this additional storage unit 150.

Then, in a step 360, the power supply control program 200 spins up the data HDDs which make up the RAID group which has been designated.

Due to the additional unit power supply control 330 shown in FIG. 14 and described above, by the management software 110 commanding the spinning down or up of the specified RAID group, the turning ON and OFF of the power supply individually to each of the additional chassis 152, in other words to each of the additional storage units 150, is performed automatically. As a result, the advantageous effect for economization of electrical power is higher than in the case of the prior art technique.

Although certain embodiments of the present invention have been explained in the above description, this has only been by way of example in order to clarify the present invention, and is not to be considered as being limitative of the scope of the present invention in any way. The present invention may be implemented in various manners other than the embodiments described above, provided that its gist is not deviated from.

The invention claimed is:

1. A storage control apparatus, comprising:

a plurality of storage units each comprising a plurality of storage devices;

power supply devices which have a function of turning ON and OFF supply of power to each of said plurality of storage units individually; and a control device which can communicate with a management device for inputting commands of various types, wherein said control device:

receives a RAID (Redundant Array of Independent Disks) setting command from said management device which designates two or more storage devices within said plurality of storage units, and sets said two or more storage devices which have been designated as a single RAID group;

receives a spare setting command from said management device which designates at least one storage device within said plurality of storage units, and sets said at least one storage device which has been designated as a spare device for said single RAID group;

performs unit power supply control by controlling said power supply devices so as to turn the power supply to each of said storage units ON and OFF individually;

controls said management device when said RAID setting command is inputted, so that said two or more storage devices which can be designated by said RAID setting command as said single RAID group are limited to being only said two or more storage devices which are present in a same storage unit;

receives a function setting command from said management device which designates whether or not said unit power supply control is to be valid, and sets said unit power supply control to be valid or invalid according thereto; and when said individual turning ON and OFF function is changed over from invalid to valid, checks whether or not two or more of the storage devices which are included in said single RAID group are present as dispersed over different storage units, and if the result of this check is YES, notifies said management device of the necessity of re-setting that RAID group, wherein when said individual turning ON and OFF function has been changed over from invalid to valid, said control device further checks whether or not said copy-back is set as said recovery processing, and if a result of checking is YES, said control device notifies said management device of a necessity of changing from copy-back to copy-backless.

2. The storage control apparatus according to claim 1, wherein said control device further controls said management device when said spare setting command is inputted, so that said at least one storage device which can be designated by said spare setting command as said spare device for said single RAID group is limited only to those storage devices which are present within the same storage unit as said single RAID group.

3. The storage control apparatus according to claim 2, wherein said control device further:

receives from said management device a recovery processing setting command which designates either copy-back or copy-backless as recovery processing from a failure of a RAID group which utilizes a spare device, and sets one recovery processing which has been designated by said recovery processing setting command;

when said copy-back is set for said recovery processing, checks whether or not said plurality of storage devices which have different storage capacities are present within said same storage unit, and if a result of this check is YES, controls said spare setting command which is inputted to said management device, so that only said at least one storage device which has a largest storage capacity within said same storage unit can be set as said spare device; and when said copy-backless is set for said recovery processing, controls said spare setting command which is inputted to said management device, so that said at least one storage device which can be designated by said spare setting command as said spare device for said single RAID group is installed in said single RAID group as a new storage device.

4. The storage control apparatus according to claim 1, wherein said control device further selects one at a time of said plurality of storage units, and controls said management device when said RAID setting command and said spare setting command are both inputted, so that the plurality of storage devices which can be designated by said RAID setting command and said spare setting command as said single RAID group and said spare device for said single RAID group are limited to being only the plurality of storage devices which are present within said single storage device which has been selected.

5. The storage control apparatus according to claim 1, wherein each of said plurality of storage units is contained within a different chassis.

6. The storage control apparatus according to claim 1, wherein said control device further receives from said management device a spin down command or a spin up command designating said single RAID group, and controls supply of power to said same storage unit included in said single RAID group which has been designated based thereupon.

7. The storage control apparatus according to claim 6, wherein, in response to said spin down command, said control device checks whether or not all of the two or more storage devices within said same storage unit which is included in said single RAID group which has been designated are in a state in which they can be spun down, and, if a result of this check is YES, turns OFF the power supply to said same storage unit which is included in said single RAID group which has been designated.

8. The storage control apparatus according to claim 6, wherein, in response to said spin up command, said control device checks whether the power supply to said same storage unit which is included in said single RAID group which has been designated as OFF or ON, and, if a result of this check is YES, turns ON the power supply to said same storage unit which is included in said single RAID group which has been designated, and thereafter spins up said single RAID group which has been designated.

9. The storage control apparatus according to claim 1, wherein said plurality of storage units includes at least one base storage unit and one or more additional storage units, wherein said power supply devices comprise a base power supply unit which supplies power to said control device and said base storage unit, and one or more switchable power supply units which supply power individually to each of said one or more additional storage units, and which can be powered ON or OFF individually, and wherein the storage control apparatus further comprises:

one or more back end switches which connect each of said one or more additional storage units individually to said control device, and which can powered ON or OFF individually.

10. A method for economizing upon electrical power for a storage control apparatus which comprises a plurality of storage units each comprising a plurality of storage devices, comprising the steps of:

receiving a RAID (Redundant Array of Independent Disks) setting command from a management device which designates two or more storage devices within said plurality of storage units, and setting said two or more storage devices which have been designated as a single RAID group;

receiving a spare setting command from said management device which designates at least one storage device within said plurality of storage units, and setting said at least one storage device which has been designated as a spare device for said single RAID group;

performing unit power supply control by controlling power supply devices so as to turn a power supply to each of said storage units ON and OFF individually;

controlling said management device when said RAID setting command is inputted, so that two or more storage devices which can be designated by said RAID setting command as a single RAID group are limited to being only said two or more storage devices which are present in a same storage unit;

receiving a function setting command from said management device which designates whether or not said unit power supply control is to be valid, and setting said unit power supply control to be valid or invalid according thereto; and when said individual turning ON and OFF function is changed over from invalid to valid, checking whether or not two or more of the storage devices which are included in said single RAID group are present as dispersed over different storage units, and if the result of this check is YES, notifying said management device of the necessity of re-setting that RAID group, wherein when said individual turning ON and OFF function has been changed over from invalid to valid, said further checking whether or not said copy-back is set as said recovery processing, and if a result of checking is YES, notifying said management device of a necessity of changing from copy-back to copy-backless.

11. The method according to claim 10, further comprising a step of controlling said management device when said spare setting command is inputted, so that said at least one storage device which can be designated by said spare setting command as said spare device for said single RAID group is limited only to those storage devices which are present within the same storage unit as said single RAID group.

* * * * *